Feb. 28, 1961 G. B. HIRSCH 2,972,936
MILLING MACHINE KNEE WITH DRIVE
SHAFT AND SCREW IN SADDLE
Filed July 11, 1957 3 Sheets-Sheet 1
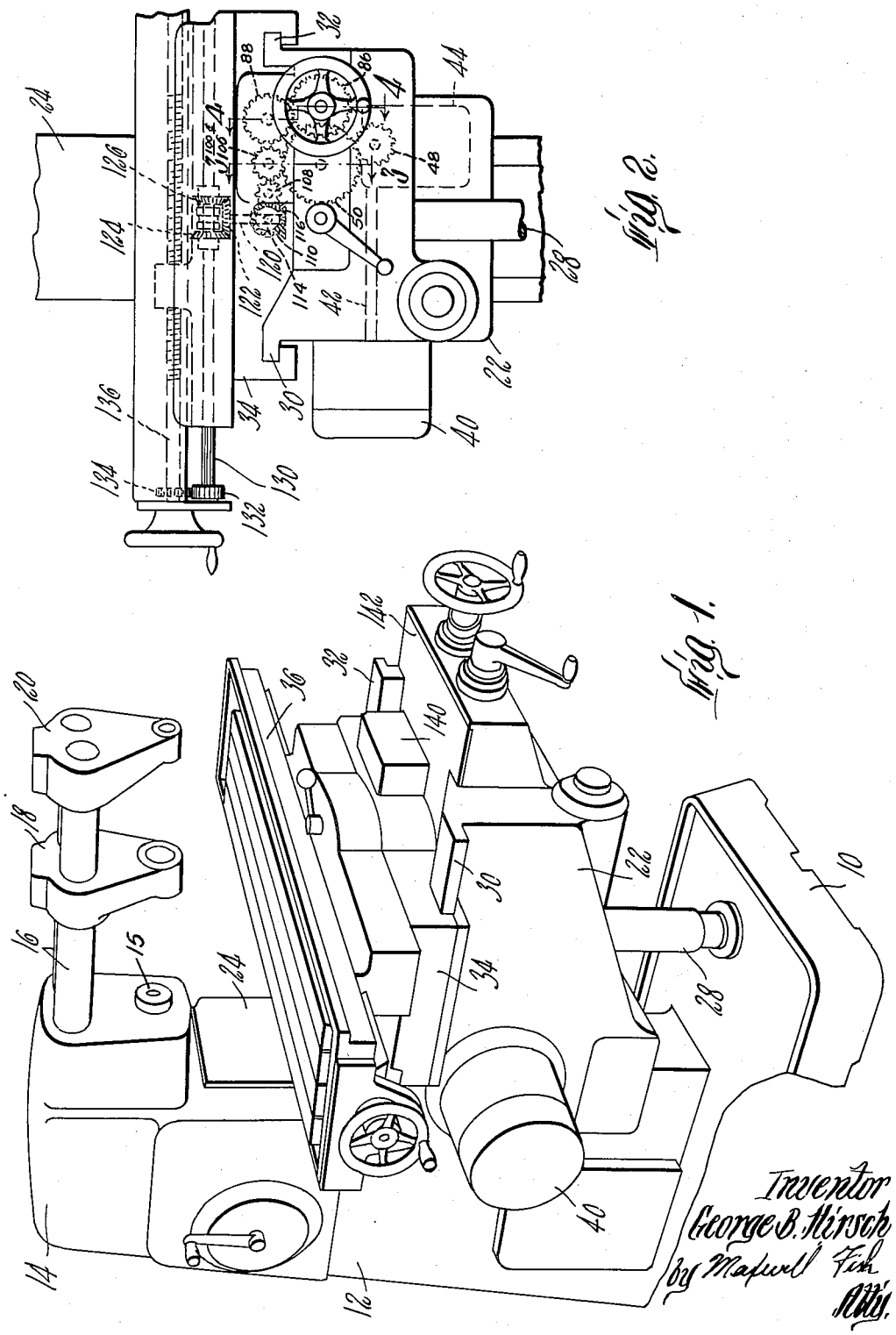
Inventor
George B. Hirsch
by Maxwell Fish
Atty.

Feb. 28, 1961 G. B. HIRSCH 2,972,936
MILLING MACHINE KNEE WITH DRIVE
SHAFT AND SCREW IN SADDLE
Filed July 11, 1957 3 Sheets-Sheet 2
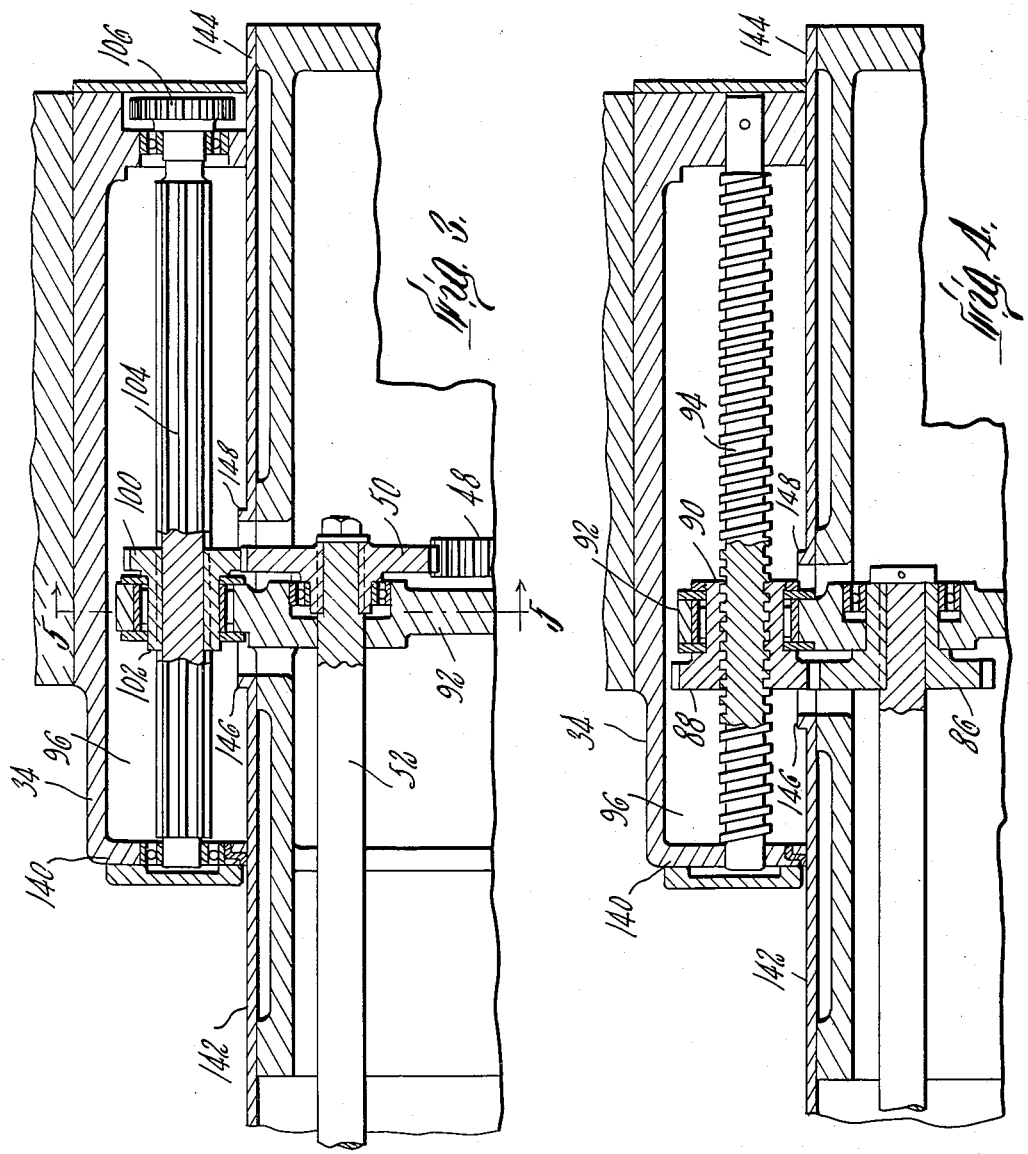
Inventor
George B. Hirsch
by Maxwell Fish
Atty.

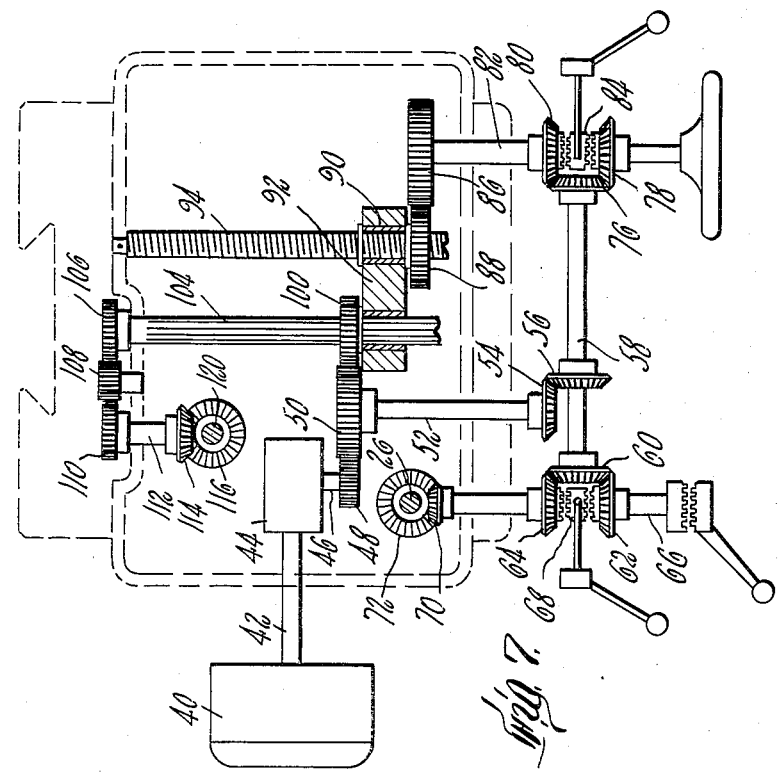

United States Patent Office 2,972,936
Patented Feb. 28, 1961

2,972,936

MILLING MACHINE KNEE WITH DRIVE SHAFT AND SCREW IN SADDLE

George B. Hirsch, Providence, R.I., assignor to Brown & Sharpe Mfg. Co., Providence, R.I., a corporation of Rhode Island Filed July 11, 1957, Ser. No. 671,209

5 Claims. (Cl. 90—21)

The present invention relates to an improved construction and arrangement of the driving mechanism for the table and saddle taken from the knee of a milling machine having a conventional work support assembly including table, saddle and knee.

In a milling machine of the general type herein disclosed the drives for the table, saddle and knee may be taken from an electric motor which may be mounted, for example, on the vertically adjustable knee. Translatory movements of each of the knee, saddle and table are effected by means of screw and nut driving connections which in each instance must include a screw shaft of sufficient length to cover the required span of movement of the driven support.

The present invention is particularly concerned with a construction and arrangement of the driving connections extending between the saddle and knee which will permit these connections, and more particularly the saddle screw with its rotating nut and a splined table driving shaft by means of which motion is transmitted between the saddle and the knee to be at all times completely housed within the saddle support.

In milling machines of the general type disclosed having the conventional table, saddle and knee work support assembly, the saddle screw and nut connected between the knee and the saddle for imparting forward and back translatory movements to the saddle together with the motion transmitting spline shaft referred to, normally mounted on the knee, are required to be of such length that the screw and spline shaft respectively project from beneath the saddle for at least a portion of their lengths. Such exposed portions of the saddle screw are conventionally protected from dirt accumulation and chips by means of telescoping tubes or sliding covers.

It is a principal object of the invention to provide an improved and simplified organization of the work support assembly of a milling machine which will include an improved and more efficient arrangement of the driving connections for the table, saddle and knee and will provide for the more efficient enclosure of the operating parts including particularly those by means of which translatory movements are transmitted from the knee to the saddle and table supports.

It is a further object of the invention to provide a more compact and more efficient arrangement of the operating connections through which the drives for the table and saddle are transmitted from the power source in the knee to the transversely movable saddle.

In accordance with the present invention, it is proposed to drive the saddle and table from a feed motor mounted on the knee of the machine through connections which include a spline shaft on the saddle and a cooperating spline sleeve driving member through which the drive is taken to the table, and a saddle feed screw on the saddle which meshes with a rotatable nut on the knee for imparting translatory movement to the saddle. The spline shaft and feed screw are mounted in parallel relation within a channel formed in the underside of the saddle, the cooperating driving sleeve and nut being carried respectively on a bearing supporting bracket which forms part of the knee and which projects upwardly through a relatively small opening in the top plate of the knee and into said channel.

The illustrated construction is particularly arranged so that the table driving spline shaft and the saddle feed screw supported in the forward and back extending channel formed in the underside of the saddle referred to, and the rotatable driving elements respectively threaded and keyed thereto, are at all times completely covered and protected from any infiltration of dirt or chips. The channel in the underside of the saddle and the upwardly extending cast portion of the knee above referred to are so located with relation to the path of movement of the saddle to permit full freedom of movement of the saddle to each of its forward and back limiting positions.

With the above and other objects in view as may hereinafter appear, the invention consists also in the devices, combinations and arrangement of parts hereinafter described and claimed, which together with the advantages to be obtained thereby will be readily understood by one skilled in the art from the following description taken in connection with the accompanying drawings in which Fig. 1 is an isometric view of a milling machine having a knee, saddle and table work support assembly which embodies in a preferred form the several features of the invention;

Fig. 2 is a somewhat detailed view in relation to a portion of the table, saddle and knee assembly illustrating particularly the driving connections by means of which each of these support elements are driven from a feed motor and knee;

Fig. 3 is a sectional view taken on a line 3—3 of Fig. 2 looking from the right but on an enlarged scale illustrating particularly the upper portion of the knee and saddle mounted thereon together with the driving connections including the spline shaft and cooperating sleeve element by means of which the table is driven through the knee and saddle;

Fig. 4 is a sectional view taken on a line 4—4 of Fig. 2 passing through the saddle feed screw to illustrate particularly several of the driving connections for the saddle;

Fig. 5 is a detail sectional view taken on line 5—5 of Fig. 3 illustrating particularly the bearing bracket which forms part of the knee support being arranged to project upwardly through a small aperture in a cover plate of the knee into a table spline shaft and saddle feed screw supporting channel formed in the underface of the saddle;

Fig. 6 is an isometric view of the upper portion of the knee illustrating particularly the saddle guideways, the upwardly projecting bearing support bracket and the cover plates by means of which the mechanism mounted within the knee is protected.

Fig. 7 is a somewhat developed plan view of the driving connections from the feed motor on the knee, for imparting translatory movement to each of the knee, saddle and table.

The milling machine shown in the drawings comprises a base 10 on which is mounted a column 12 having at its upper end a head 14 which carries a tool spindle 15 and on which are mounted two horizontal arbor support rods 16 adapted to carry two arbor support brackets 18 and 20, these parts being centrally disposed on the front face of the column. The machine is provided with a work support assembly which includes a knee 22 mounted for vertical adjustment on ways 24 formed on the front face of the column 12, said vertical adjustment being effected by an elevating screw indicated at 26 in Fig. 7, and arranged to be covered by a telescopic tubular guard 28.

The knee 22 has formed thereon a pair of horizontally disposed forward and back extending ways 30, 32 on which is mounted a saddle 34. The saddle in turn is provided with transversely extending ways on which there is mounted the work table 36.

Power operation of each of the knee, saddle and table is effected by means of an electric motor generally designated at 40 in Fig. 1 and Fig. 7 mounted on the knee 22. As best shown in Fig. 7 the drive is taken from the motor 40 through a shaft 42 to a gear box 44 having an output shaft 46 which is connected by gears 48, 50 with a forwardly extending shaft 52, in turn connected through beveled gears 54, 56 with a transversely extending shaft 58 housed within the front part of the knee.

Shaft 58 is connected to drive the knee elevating screw 26 through connections which include beveled gear 60 which meshes with two reversely driven beveled gears 62, 64 on a rearwardly extending shaft 66. The direction of drive of the shaft 66 is controlled by means of a reversing clutch member 68 keyed to the shaft 66 and arranged to be shifted in either direction from an intermediate neutral position shown in Fig. 7 into engagement with clutch faces formed respectively on the reversely driven gears 64 and 62. Shaft 66 at its rear end is provided with a beveled gear 70 which meshes with a beveled gear 72 mounted on the elevating screw 26.

The shaft 58 is connected to drive the saddle screw and nut assembly through connections which comprise a beveled gear 76 on shaft 58 which meshes with two reversely driven gears 78 and 80 loosely sleeved on a rearwardly extending shaft 82. A reversing clutch member 84 keyed to the shaft 82 is shiftable from the intermediate neutral position shown in Fig. 7 into engagement alternatively with clutch teeth formed respectively on the reversely driven gears 78 and 80. At its rear end the shaft 82 is provided with a spur gear 86 which meshes with a gear 88 formed on one end of a saddle screw engaging nut 90 externally supported in a bearing formed in an upwardly extending bearing support bracket 92 which forms part of the knee 22. The nut 90 is threaded to a saddle actuating screw 94 (see Fig. 4) which is mounted in a forwardly and back extending well or channel 96 formed in the underside of the saddle 34. The saddle actuating screw 94 is rigidly secured at its end to the saddle by means of a pin.

The drive for the table 36 is taken from gear 50 which meshes with a gear 100 formed on one end of a spline sleeve 102 (see Fig. 3) mounted in a bearing formed in the upwardly extending bearing support bracket 92 formed in the knee 22. The spline sleeve 102 meshes with a forwardly and rearwardly extending spline shaft 104 rotatably mounted at its forward and rear ends in bearings formed in the saddle 34 and its rear end provided with a gear 106 which meshes with an idler gear 108 which in turn drives a gear 110 mounted on one end of a short shaft 112 rotatably mounted on the saddle 34. A beveled gear 114 secured to the other end of the shaft 112 meshes with a beveled gear 116 on the lower end of a vertically extending table drive shaft 120 (see Fig. 2). A beveled gear 122 on shaft 120 meshes with two reversely driven gears 124, 126 on a horizontal table drive shaft 130 which is connected at its left hand end as shown in Fig. 2 by means of gears 132 and 134 with a table screw 136. The shaft 130 is driven in either direction from the vertical shaft 120 by means of a reversing clutch member splined to the shaft 130 and arranged to be shifted from an intermediate neutral position in either direction into engagement with correspondingly formed clutch faces on the respective reversely driven gears 124, 126.

In order that the driving connections between the knee and the saddle may be at all times fully housed and protected by the saddle, it will be noted particularly from Figs. 1, 3 and 4 that a box-like housing 140 is formed on the forward side of the saddle 34 which forms an extension of the well 96 which is thus made long enough to house the saddle feed screw 94. It will also be noted particularly from Figs. 3 and 4 of the drawing that the upwardly extending bearing support bracket 92 which forms an integral part of the knee 22 is so located as to permit the saddle to move freely to each of its forward and back limiting positions.

In order to avoid any possibility that chips or other extraneous material may find its way into the moving parts supported within the knee, portions of the knee extending between the ways 30 and 32 are covered by two plates 142, 144. The forwardly disposed fixed plate 142 covers the entire forward portion of the knee and terminates at its rear end in an upwardly extending lip 146 adjacent the bearing support bracket 92. The rearwardly disposed fixed plate 144 covers the rear portion of the knee and extends forwardly to a point adjacent the bracket 92 and is provided with a raised lip 148. The lips 146 and 148 provide additional protection against infiltration of chips or other extraneous material into the operating mechanism. While for convenience of assembly, the two plates 144 and 146 may be separate members, these parts together with the lips 146 and 148 are shown in Fig. 6 as an integral unit. The lips 146 and 148 are shaped to entirely surround the support bracket 92.

As best shown in Figs. 3 and 4 the overlying saddle is provided at its forward and rearward edges with surfaces which engage against the plates 142 and 144 respectively and serve as scraping elements to clear the chips from the surface of the knee as the saddle is advanced in one or the other direction.

The construction and arrangement of the driving mechanism above described comprising the screw driving nut 90 on the upwardly extending bracket 92 and saddle screw 94 mounted within the saddle well 96 by means of which translatory movement is imparted to the saddle, and the similarly mounted spline sleeve element and spline shaft by means of which motion is transmitted to drive the table provides a simple and at the same time most efficiently compact organization of these mechanisms for effecting these several movements. The driving mechanism above described is most efficiently supported and housed within the knee and saddle assembly having as salient characteristics thereof, the upwardly extending bearing support bracket carried on the knee, and the associated saddle screw and spline shaft receiving well formed in the underside of the saddle.

The invention having been described what is claimed is:

1. In a milling machine, a column with a tool spindle and vertical knee supporting ways centrally disposed at the front side of said column, and a work support assembly having a vertically adjustable knee with ways extending in a forward and back direction and with an upwardly projecting bearing support bracket mounted on the knee between said ways, cover means forming a fixed part of the knee enclosing portions of the knee disposed between said ways on the knee and surrounding said upwardly projecting bearing support bracket, a saddle mounted on said ways formed with a bearing support bracket receiving channel in the underside thereof extending lengthwise of and between said ways, and a table mounted on the saddle for movement longitudinally, means for imparting translatory movements to each of the knee, saddle and table including a power source on the knee, power transmitting connections from said power source located within the knee including a saddle drive nut and a splined table driving sleeve element rotatably mounted to turn on parallel axes on said bearing support bracket within the channel formed in the underside of the saddle, a saddle feed screw secured to the saddle and wholly contained within said channel and threaded to said saddle drive nut, a spline table drive shaft rotatably supported on the saddle within said channel in parallel relation to the saddle screw and splined to said splined table driving sleeve element, and power transmitting connections from said spline shaft wholly contained within the saddle and table for driving the table from said spline shaft longitudinally with relation to the saddle.

2. In a milling machine having a column with a tool spindle and vertical knee supporting ways centrally disposed at the front side of said column, and a work support assembly including a vertically adjustable knee with ways extending in a forward and back direction and an upwardly projecting bearing support bracket mounted on the knee between said ways, a saddle mounted on said ways formed with a bearing support receiving channel in the underside thereof extending lengthwise of and between said ways, and a table mounted on the saddle for movement longitudinally, driving mechanism including a power source on the knee, and power transmitting connections from said power source encased within the knee and including a saddle drive nut rotatably mounted on said upwardly extending bearing support bracket and a saddle feed screw wholly contained within and fixed to the saddle in said channel and threaded to said saddle drive nut.

3. In a milling machine having a column with a tool spindle and vertical knee supporting ways centrally disposed at the front side of said column, and a work support assembly comprising a vertically adjustable knee with ways extending in a forward and back direction and an upwardly projecting bearing support bracket mounted from the knee, a saddle mounted on said ways with a bearing support receiving channel formed in the underside thereof parallel to said ways and overlying said bracket, and a table mounted on the saddle for movement longitudinally, motion transmitting means originating within the knee for actuating the saddle and table including a saddle drive nut supported on said bracket, a saddle feed screw wholly contained within the saddle in said channel and threaded to said saddle drive nut, and a splined motion transmitting sleeve element rotatably mounted on said bearing support bracket within the channel formed in the under side of the saddle, and a splined motion transmitting shaft rotatably supported in said channel in parallel relation with said saddle screw and to which said motion transmitting sleeve element is splined to drive the table, said motion transmitting means acting to rotate said saddle drive nut and splined sleeve element.

4. In a milling machine having a column with a tool spindle and vertical knee supporting ways centrally disposed at the front side of said column, and a work support assembly including a vertically adjustable knee with ways extending in a forward and back direction and an upwardly projecting bearing support bracket mounted from the knee between said ways, a saddle mounted on said ways formed with a bearing support receiving channel in the underside thereof extending lengthwise of and between said ways, and a table mounted on the saddle for movement longitudinally, driving mechanism including a power source on the knee, power transmitting connections from said power source housed within the knee and including a saddle drive nut rotatably mounted on said upwardly extending bearing support bracket and a saddle feed screw wholly contained within and fixed to the saddle in said channel and threaded to said saddle drive nut, and cover means forming a fixed part of the knee enclosing portions of the knee disposed between said ways on the knee and surrounding said upwardly projecting bearing support bracket.

5. In a milling machine a column with a tool spindle and vertical knee supporting ways centrally disposed at the front side of said column, and a work assembly including a vertically adjustable knee with ways, and power transmitting connections in accordance with claim 4, in which the cover means is provided with an upwardly extending lip surrounding said support bracket.

References Cited in the file of this patent

UNITED STATES PATENTS

| 1,330,498 | Scott | Feb. 10, 1920 |
| 1,552,607 | Hoppe | Sept. 8, 1925 |
| 2,133,102 | Kuhns | Oct. 11, 1938 |
| 2,187,854 | Hallenbeck et al. | Jan. 23, 1940 |
| 2,370,222 | Bennett et al. | Feb. 27, 1945 |
| 2,736,243 | Armitage | Feb. 28, 1956 |
| 2,780,125 | Milyard | Feb. 5, 1957 |
| 2,862,422 | Hirsch | Dec. 2, 1958 |

FOREIGN PATENTS

| 762,368 | Great Britain | Nov. 28, 1956 |
| 483,746 | Italy | Aug. 11, 1953 |